United States Patent
Ishibashi et al.

(10) Patent No.: US 6,805,355 B2
(45) Date of Patent: Oct. 19, 2004

(54) CABIN WITH LINK TYPE DOOR

(75) Inventors: Chuichi Ishibashi, Hiroshima (JP); Yoshiaki Murakami, Hiroshima (JP)

(73) Assignee: Kobelco Construction Machinery Co., Ltd., Hiroshima (JP)

(*) Notice: Subject to any disclaimer, the term of this patent is extended or adjusted under 35 U.S.C. 154(b) by 18 days.

(21) Appl. No.: 10/322,461

(22) Filed: Dec. 19, 2002

(65) Prior Publication Data

US 2003/0132645 A1 Jul. 17, 2003

(30) Foreign Application Priority Data

| Jan. 11, 2002 | (JP) | ................................. | 2002-005236 |
| Mar. 29, 2002 | (JP) | ................................. | 2002-096321 |
| Aug. 29, 2002 | (JP) | ................................. | 2002-250674 |

(51) Int. Cl.⁷ ................................................. B60J 5/04
(52) U.S. Cl. ............. 276/190.11; 296/202; 296/146.11
(58) Field of Search ................. 296/190.01, 190.08, 296/190.11, 202, 146.1, 147, 155, 146.11, 146.12; 49/502

(56) References Cited

U.S. PATENT DOCUMENTS 6,030,024 A   2/2000  Schmidhuber et al.
6,213,535 B1  4/2001  Landmesser et al.

FOREIGN PATENT DOCUMENTS

| FR | 2621641    | * 4/1989  | .................. 296/155 |
| GB | 2248649    | * 4/1992  | .................. 296/155 |
| JP | 4-122765   | 11/1992   | |
| JP | 10-220129  | 8/1998    | |
| JP | 2584492    | 11/1998   | |
| JP | 2001-107393| 4/2001    | |
| JP | 2001-115715| 4/2001    | |

* cited by examiner

Primary Examiner—D. Glenn Dayoan
Assistant Examiner—H. Gutman
(74) Attorney, Agent, or Firm—Oblon, Spivak, McClelland, Maier & Neustadt, P.C.

(57) ABSTRACT

A cabin equipped with link type door comprises two links provided on at least upper parts of both a cabin and an opening and closing door at the side of the cabin, one-side ends thereof being pivotally supported on the door and the other ends on the cabin, so that the door is retained on the cabin by the links; a movable supporter for supporting the door weight, which is provided in the middle part of the link for mainly supporting the door weight of the links; and a support member for placing the movable supporter to support the door weight and making the movable supporter travel in the opening and closing movement of the door, which is provided on the cabin, whereby the sagging of the links can be prevented to keep the link pivotal support part from shaking.

11 Claims, 8 Drawing Sheets

CABIN WITH LINK TYPE DOOR

BACKGROUND OF THE INVENTION

1. Field of the Invention

The present invention relates to a cabin equipped with link type door, and mainly relates to a cabin for construction machine such as hydraulic excavator or the like.

2. Description of the Related Art

In a link type door in an operator's cabin of a construction machine or the like, distortion of a link or shaking of a link pivotal support part was apt to occur at an early stage. Consequently, the door was sagged to increase the opening and closing operation load of the door, which then caused a trouble such as the loose closing of the door, the imperfect engagement of locking means of the door, or the like.

When a traveling or excavating work is performed in the state where the door is locked in an open end position, the vibration of the construction machine under traveling or working is large. Therefore, the vertical vibration of the door becomes larger to increase the impact applied to the link support structure of the door, which brought about the problem of low durability of the link support structure.

SUMMARY OF THE INVENTION

The present invention has an object to provide a cabin having a highly durable link support structure.

The cabin of the present invention has the following structure.

Namely, the structure comprises a cabin; a door for opening and closing a platform at the side of the cabin; links provided between an upper part of the door and an upper part of the cabin, one end of each link being pivotally supported by the upper end of the door, and the other end by the upper part of the cabin; a movable supporter for suspending and supporting the door, the movable supporter being provided on at least one of these links and including a rolling member and a sliding member; and a support member provided on the cabin to movably support the movable supporter in opening and closing movement of the door, the movable supporter being placed on the support member.

Since the movable supporter for supporting a weight of the door is provided on the link, and the movable supporter is placed on the support part provided on the cabin to support the door weight, the sagging of the link by the weight of the door can be prevented. Further, the bias load to the link pivotal support can be eliminated by the prevention of sagging of the link to keep a pivotal support part from shaking. Consequently, the durability of the link can be improved, and the door opening and closing operability is never deteriorated even by a long-term use.

DESCRIPTION OF THE PREFERRED EMBODIMENTS

The support structure of the link type door of a cabin according to one preferred embodiment of the present invention is described in reference to FIGS. 1–8C. This structure is only one embodiment of the prevent invention, and the present invention is never limited thereby.

Figure 1:
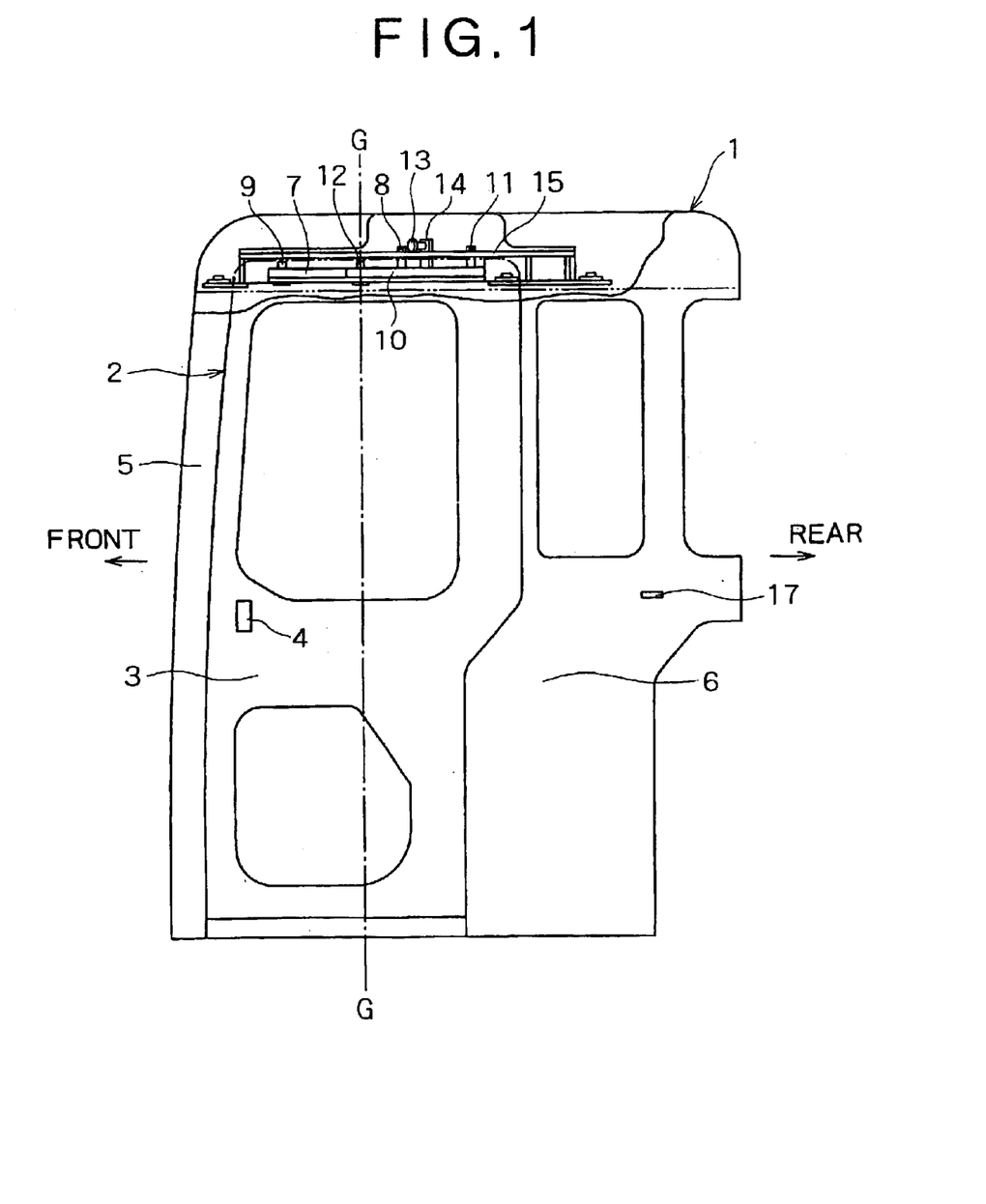
FIG. 1 is a schematic view showing the side view of a cabin including the essential part of a link type door according to the first embodiment of the present invention.
Figure 2:
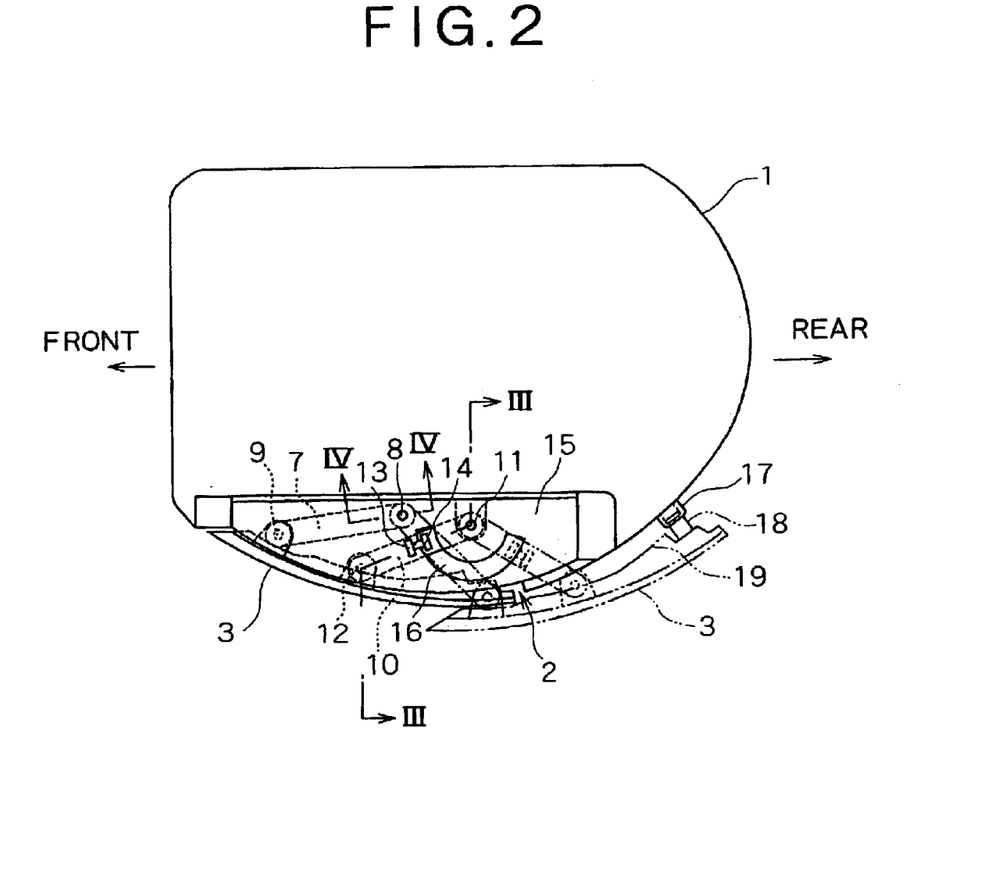
FIG. 2 is a plan view for describing the essential part of the link type door of FIG. 1.
Figure 3:
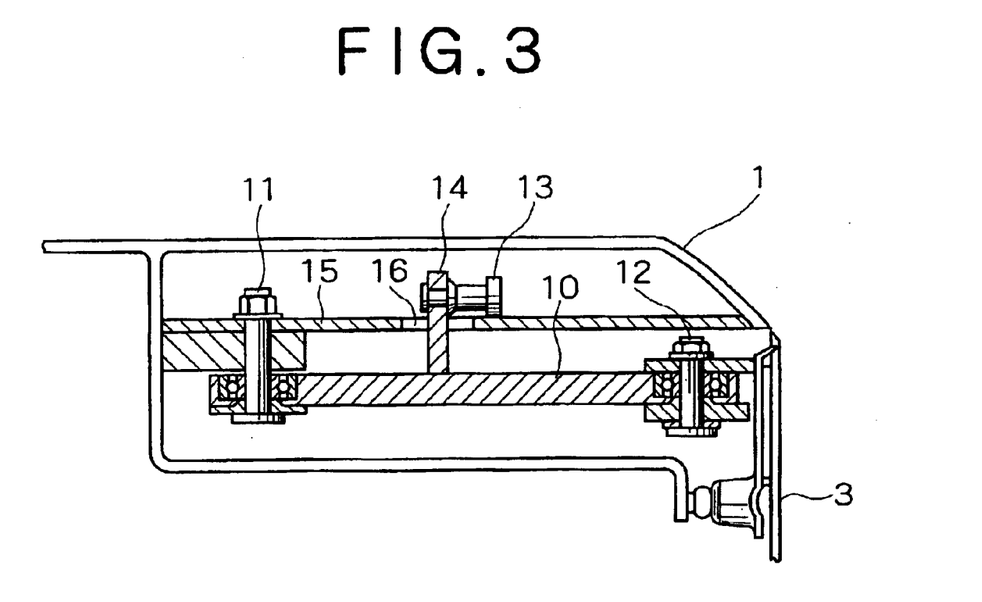
FIG. 3 is a schematic view showing a section taken along the line III—III of FIG. 2, according to one embodiment of the invention.
Figure 4:
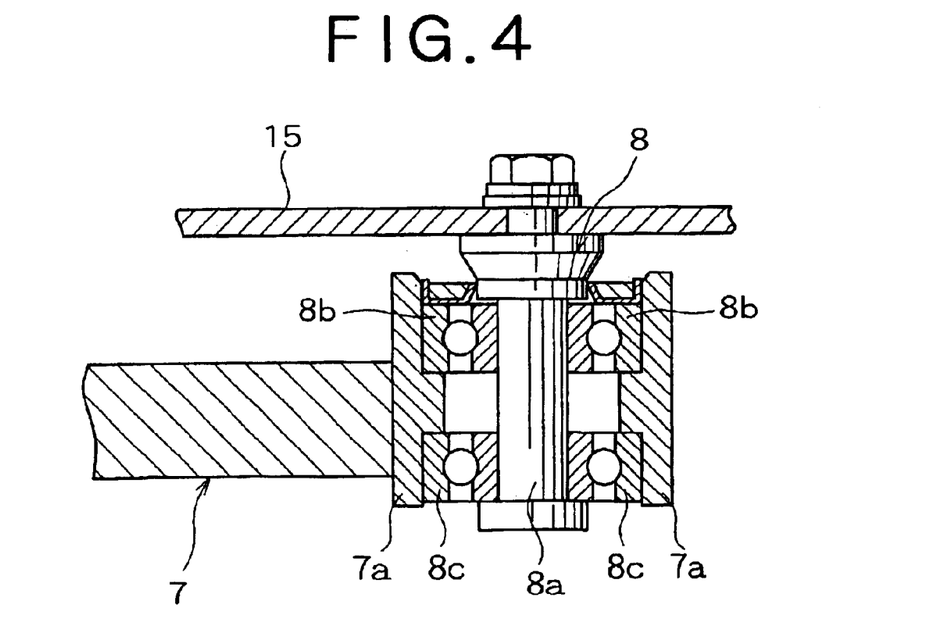
FIG. 4 is a schematic view showing a section taken along the line IV—IV of FIG. 2.

FIG. 1 is a schematic view showing the side view of a cabin including the essential part of a link type door according to this preferred embodiment. FIG. 2 is a schematic view showing the plan view of the cabin including the essential part of the link type door of FIG. 1. FIG. 3 is a schematic view showing a section taken along the line III—III of FIG. 2. FIG. 4 is a schematic view showing a section taken along the line IV—IV of FIG. 2.

In FIGS. 1 and 2, denoted at 1 is an operator's cabin mounted on an upper rotating body of a construction machine such as hydraulic excavator or the like, or the traveling body of a moving body or working machine, which is not shown. Denoted at 2 is a platform or entrance opened in the side surface of the cabin 1, 3 is a door for opening and closing the platform 2, 4 is a door handle, 5 is a strut raised in the front of the platform 2, and 6 is a side panel raised in the rear of the platform 2.

Denoted at 7 is a front link. The cabin-side end of the front link 7 is pivotally supported on a support plate 15 as a support member (described in detail below) fixed to the upper part inside of the platform 2 of the cabin 1 by a pivotal support part 8. The door-side end of the front link 7 is pivotally supported on the upper part inside of the door 3 by a pivotal support part 9.

Denoted at 10 is a rear link. The cabin-side end of the rear link 10 is pivotally supported on the support plate 15 fixed to the upper part inside of the platform 2 of the cabin 1 by a pivotal support part 11. The door-side end of the rear link 10 is pivotally supported on the upper part inside of the door 3 by a pivotal support part 12. The pivotal support part 11 of the rear link 10 is arranged closer to the rear of the cabin 1 from the pivotal support part 8 of the front link 7. The pivotal support part 9 of the front link 7 is arranged near the front end of the door 3. The pivotal support part 12 of the rear link 10 is arranged closer to the rear of the door 3 from the pivotal support part 9 of the front link 7. The pivotal support part 12 is arranged on a vertical directional center-of-gravity line G passing the center of gravity of the door 3. The rear link 10 corresponds to the first link of the present invention for mainly supporting the weight of the door 3, and the front link 7 corresponds to the second link of the present invention for giving supporting assistance to the rear link 10.

As described above, the door-side pivotal support part 12 of the rear link 10 as the first link is suitably arranged on the vertical directional center-of-gravity line passing the center of gravity of the door 3. Since the longitudinal shaking or leaning of the door can be thus prevented, a roller that is one kind of movable supporters placed on the support part can be smoothly rolled. Since the bias load or offset load to the link pivotal support part can be prevented, the durability of the link pivotal support part is further improved.

Further, since the longitudinal inclination of the door can be suppressed, the trouble that opening and closing locks provided on the front and rear of the door are not normally meshed can be prevented. Accordingly, lock operation of the door in opening and closing in an inclined ground or the like can be ensured.

In the link type door according to this embodiment, the front link 7 and the rear link 10 are pivotally supported on both the upper parts of the cabin 1 and the door 3 as shown in FIG. 1. The similar front link and rear link not shown are pivotally supported in both lower parts of the cabin 1 and the door 3, and the pivotal support position, length and the like of each link of the upper part and the lower part is the same in a plan view.

In FIGS. 2 and 3, denoted at 13 is a roller as rolling means. The roller 13 is rotatably supported on the upper part of a bracket 14 fixed to the intermediate part of the rear link 10 and extended upward. The roller 13 supports the weight of the door 3 applied to the rear link 10 through the bracket 14. Denoted at 15 is a support plate as support member located from the front link 7 and the rear link 10 upward and fixed to the upper part of the cabin 1. A circular hole 16 is formed in the support plate 15. The bracket 14 is extended through the hole 16. The bracket 14 is movable along the hole 16 in the opening and closing movement of the door 3. The support plate 15 supports the weight of the door 3 by placing the roller 13 thereon. The roller 13 is rollable on the support plate 15 in the opening and closing movement of the door 3.

As described above, the roller is suitably provided at least in the intermediate part of the first link. Since the weight of the door can be mainly supported by the roller, the load to the link and link pivotal support part can be reduced further more.

Figure 3A:
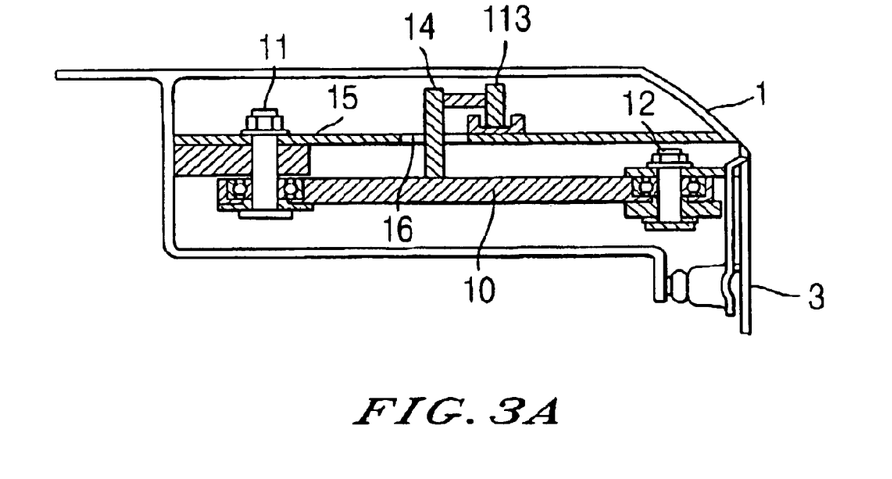
FIG. 3A is a schematic view showing a section taken along the line III—III of FIG. 2, according to another embodiment of the invention in which the movable supporter slides on the support plate.

As shown if FIG. 3A, a sliding means 113 may be used instead of the roller as rolling means. For example, a recessed rail may be provided on the support plate 15 so as to slide the sliding means 113 fixed to the bracket 14 on the rail. As the movable supporter of the present invention, any means movable while supporting the link may be used.

In FIGS. 1 and 2, denoted at 17 is a cabin-side lock member provided on the side surface of the cabin 1 in the rear of the door 3. The cabin-side lock member 17 is protruded from the side surface of the cabin 1 in substantially U-shape.

Denoted at 18 is a door-side lock member fixed to a reinforcing plate 19 on the reverse side of the door 3. The lock member 18 regulates the opening and closing directional movement of the door when caught on the substantially U-shaped cabin-side lock member 17 and engaged therewith. The lock member 17 and the lock member 18 constitute lock means. When the door 3 is the open end position, the lock member 17 and the lock member 18 are mutually engaged and mutually regulated in the door opening and closing directional movement. Accordingly, the door 3 is retained in the opening end position. Further, locking means for retaining the door 3 in a close end position shown by an actual line or solid line in FIG. 2 at any time when the door 3 is in this end position may be provided. The lock means are not limited to the above structure, and known applicable structures may be adapted.

In the pivotal support part 8 for pivotally supporting the cabin-side end part of the front link 7, as shown in FIGS. 2 and 4, a connecting cylinder 7a formed at the end of the front link 7 is connected to a pivot 8a. The pivot 8a and the connecting cylinder 7a are formed in a relatively long dimension along the axial direction as shown. A vertical pair of bearings 8b, 8c are interposed between the pivot 8a and the connecting cylinder 7a, so that the rotation of the front link 7 is smoothened. The connecting cylinder 7a is laid in the state vertically nipped by the bearings 8b, 8c in the inner part, and connected to the pivot 8a without shaking or bumping. The pivot 8a, the connecting cycling cylinder 7a and the bearings 8b, 8c constitute the vertical movement regulating means of the present invention.

In the pivotal support part 8, the pivot 8a and the connecting cylinder 7a are formed in a relatively long dimension along the axial direction of the pivot. According to this, the shaking or bumping of the connecting cylinder 7a supported by the pivot 8a is sufficiently suppressed. When the smooth rotation of the front link 7 is sufficiently obtained, the bearings 8b, 8c may not be provided. The vertical pair of bearings 8b, 8c is provided in this embodiment, but, other bearings may be further juxtaposed with the bearings 8b, 8c although not shown. In this case, the suppressing effect of shaking is further more enhanced.

As described above, the vertical movement regulating means for regulating the vertical rocking of the second link is preferably provided on the cabin-side pivotal support part of the second link in the present invention. According to this, since the longitudinal inclination or vibration of the door can be more surely prevented, the durability of the link support structure can be improved.

As one embodiment of the vertical movement regulating means, the vertical movement regulating means is formed of the pivot 8a stationarily provided on the cabin 1 and the connecting cylinder 7a provided on one end part of the second link, pivotally fixed to the pivot, and formed in a length for regulating the vertical rocking of the second link along the axial direction of the pivot.

At this time, the bearings 8b, 8c for rotatably and vertically connecting the second link are provided between the pivot 8a and the connecting cylinder 7a, the bearings keeping the second link from moving vertically, whereby the longitudinal inclination or vibration of the door can be surely prevented with a simple structure while obtaining the smooth rotation of the second link.

The operation of the support structure of the link type door of the cabin according to this embodiment is then described. As shown in FIGS. 1–3, the door 3 is retained on the cabin 1 by the front link 7 and rear link 10 pivotally supported by the door 3 and the cabin 1, respectively. The weight of the door 3 is applied to the front link 7 and rear link 10 through each door-side pivotal support part 9, 12, and the load applied to these links is applied to the cabin 1 through each cabin-side pivotal support part 8, 11. The load of the door 3 applied to the rear link 10 is supported by the support plate 15 through the roller 13 as shown in FIG. 3. Accordingly, the distortion of the rear link 10 can be reduced to prevent the sagging or bumping of the door 3. The bias load or offset load applied to the door-side pivotal support part 11 can be reduced to prevent the shaking of the link pivotal support part. Particularly, since the rear link 10 is the link to which the load of the door 3 is mainly applied, the roller 13 is provided on the rear link 10 to support the weight of the door 3, whereby the load to the link or the pivotal support part can be more effectively reduced.

Since the door-side pivotal support part 12 of the rear link 10 is arranged substantially on the center-of-gravity line G of the door 3 as shown in FIG. 1, the longitudinal inclination of the door 3 can be prevented. Accordingly, the roller 13 can be smoothly rolled on the support plate 15 provided on the door 3 to smoothen the opening and closing operation of the door 3. Since the bias load to the pivotal support part of each link is eliminated, the durability of each pivotal support part is improved. Further, since the connecting cylinder 7a of the front link 7 is connected to the pivot 8a of the pivotal support part 8 through the bearings 8b, 8c without shaking as shown in FIG. 4, the longitudinal or vibration of the door 3 can be more surely prevented through the link 7 in addition to the smooth opening and closing operation of the door 3.

Figure 5:
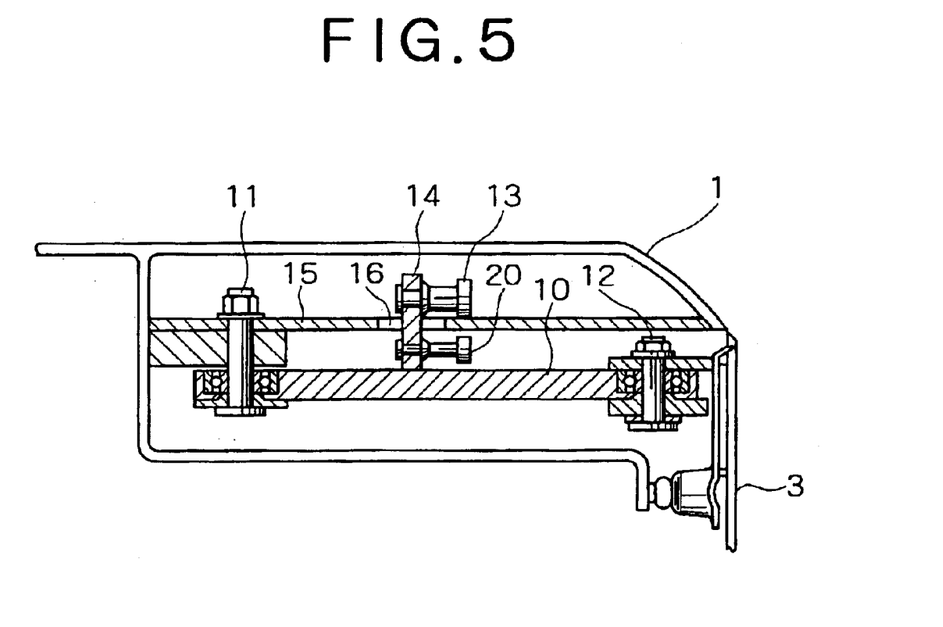
FIG. 5 is a schematic sectional view showing a modified example of the essential part of the link type door of FIG. 3.

A modified example of this embodiment is described in reference to FIG. 5. FIG. 5 is a modified example of the support structure of the link type door of the embodiment of FIG. 3. In the link type door of FIG. 5, a roller 20 supported by the bracket 14 fixed to the intermediate part of the rear link 10 is rotatably provided on the lower side of the support plate 15 of FIG. 3. The other structure is the same as that of FIG. 3. The roller 20 is arranged in contact with or with a slight space from the support plate 15. In the cabin of a construction machine or the like, the door is easily shaken by the rocking during rotation of the upper rotating body equipped with the cabin. Thus, in addition to the roller 13 placed on the support plate 15, the roller 20 is provided on the lower side of the support plate 15, whereby the shaking of the door 3 by the rocking during rotation can be prevented.

In the above embodiment of the present invention, two links are pivotally supported not only on both the upper parts of the door and cabin but also on the lower parts thereof. However, without being limited by this, the lower part of the cabin may comprise a rail according to the rail for the opening and closing movement of the door on the basis of the movement of the two links provided on both the upper parts of the door and cabin, and the lower part of the door may comprise a roller or guide member moved along this rail according to the opening and closing movement of the door.

Figure 6:
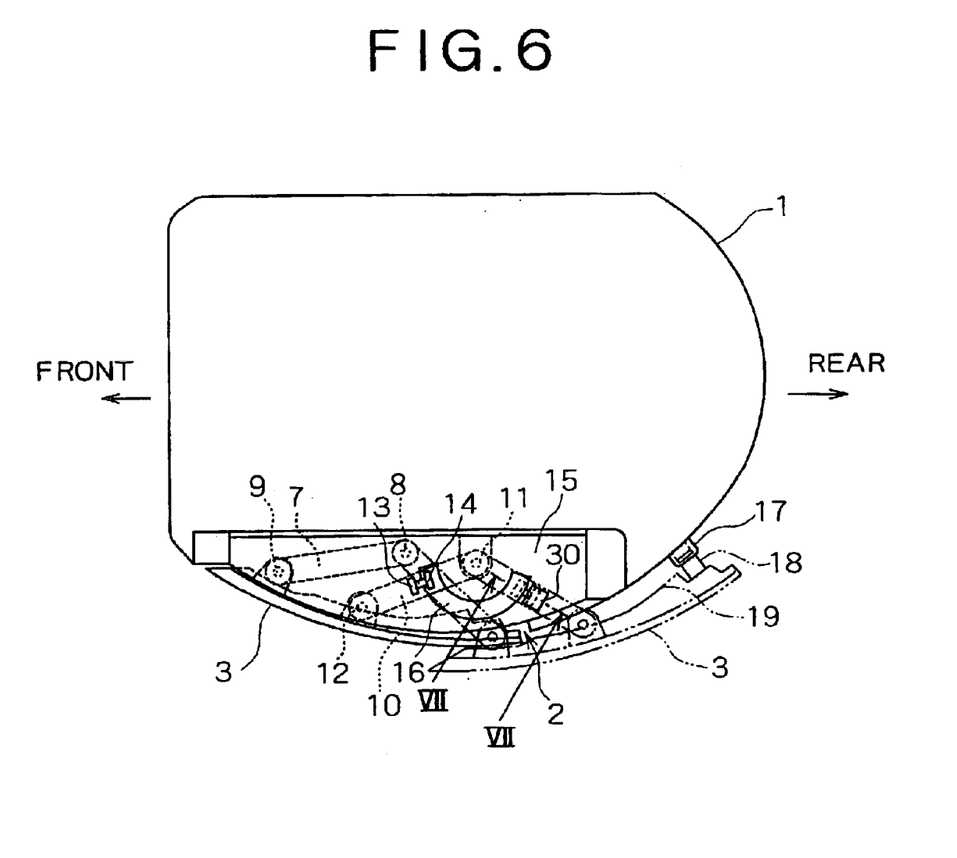
FIG. 6 is a plan view of a cabin for describing the essential part of a link type door according to another embodiment of the prevent invention.
Figure 7:
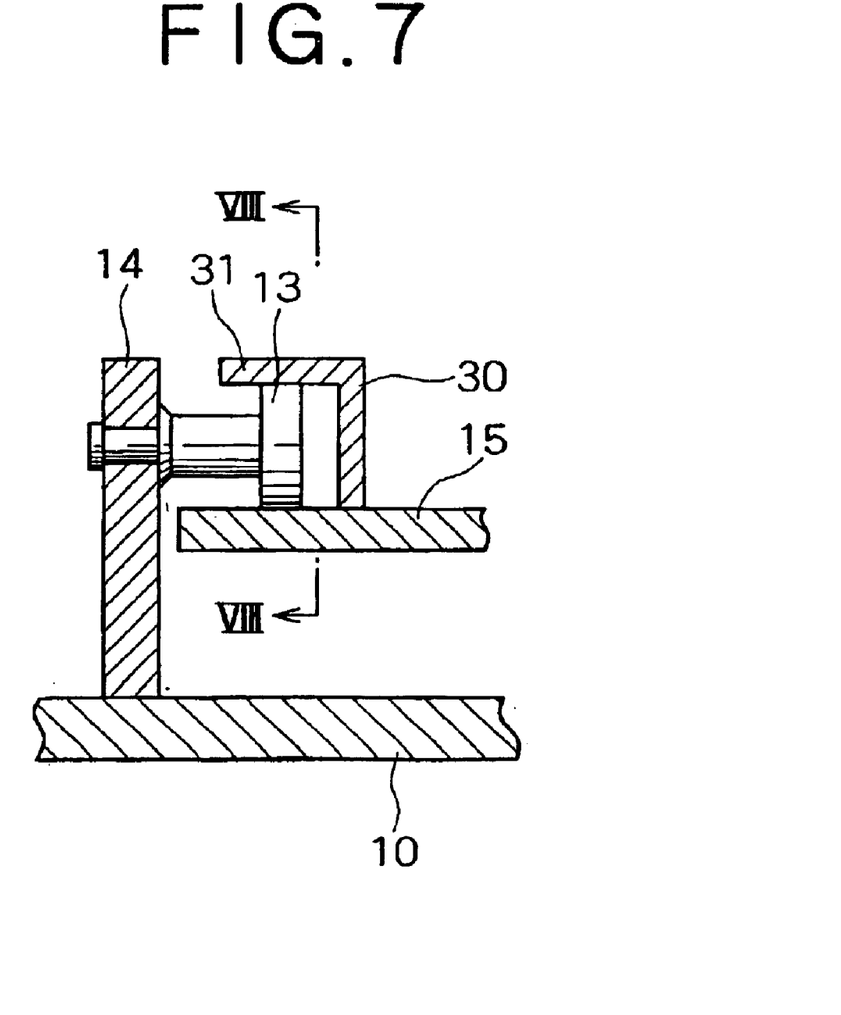
FIG. 7 is a schematic view showing a section taken along the line VII—VII of FIG. 6.
Figure 8A:
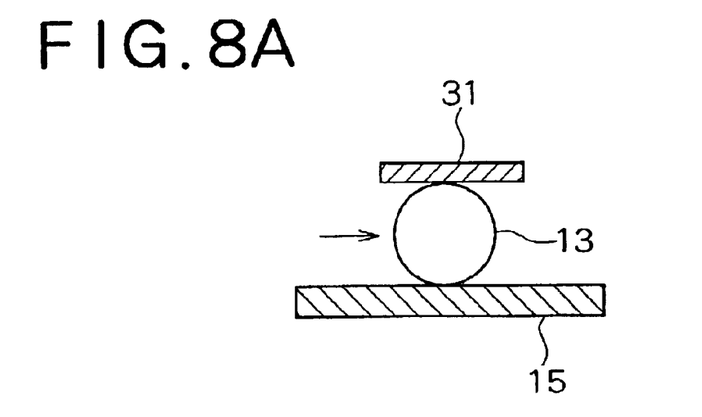
FIG. 8A is a schematic view showing a section taken along the line VIII—VIII of FIG. 7.
Figure 8B:
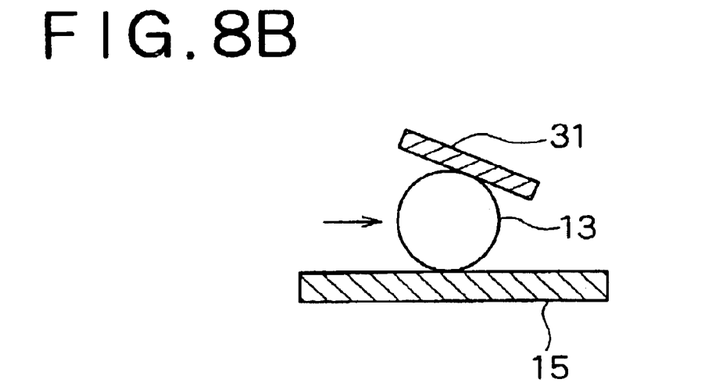
FIG. 8B is a sectional schematic view of a modified example thereof.
Figure 8C:
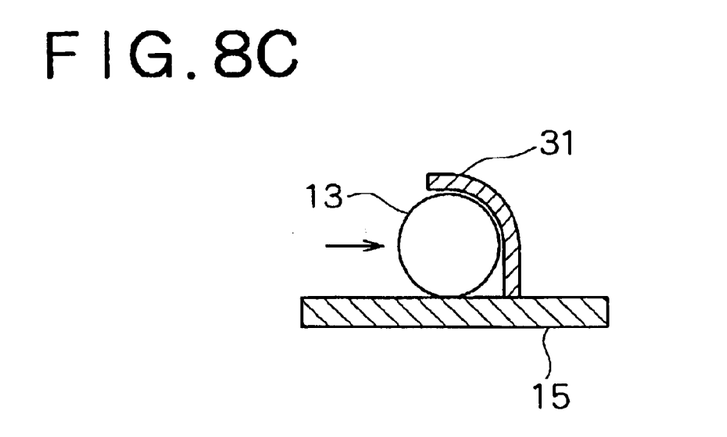
FIG. 8C is a sectional schematic view of another modified example thereof.

Another embodiment of the present invention is further described. FIG. 6 is a plan view of a cabin for describing the essential part of a link type door according to another embodiment, FIG. 7 is a schematic view showing a section taken along the line VII—VII of FIG. 6, FIG. 8A is a schematic view showing a section taken along the line VIII—VIII of FIG. 7, FIG. 8B is a schematic view showing a section of a modified example thereof, and FIG. 8C is a schematic view showing a section of another modified example.

When the door 3 is in the open end position as shown in FIG. 6, the cabin-side lock member 17 and the door-side lock member 18 as lock means are mutually engaged and regulated in the door opening and closing directional movement. Thus, the door 3 is retained in the open end position. A stopper 30 that is an upward movement regulating means for regulating the upward movement of the roller 13 is provided in the open end position of the door 3 as shown in FIGS. 6 and 7. The stopper 30 is fixed onto the support plate 15 as shown in FIG. 7. The stopper 30 has a regulation part 31 which abuts on the roller 13 placed on the support plate 15 to regulate the upward movement of the roller 13 when the roller 13 is apt to move upward by the vibration during traveling or working of the construction machine. When the door 3 is in the open end position as shown in FIG. 6, the upward movement of the roller 13 is regulated by the stopper 30 that is the upward movement regulating means in the state where the door 3 is retained in the open end position by the lock means 17 and 18. Consequently, the vertical vibration of the door during traveling or working of the construction machine is completely reduced. Thus, the impact to the link support structure is moderated, and the durability of the link support structure is consequently improved.

Particularly, in a one comprising the roller in the intermediate part of the link for mainly supporting the door weight as in the embodiment of FIG. 6, and further the pivotal support part of the link arranged on the door vertical directional center-of-gravity line passing the center of gravity of the door, the upward movement of the roller 13 is regulated by the stopper 30 that is the upward movement regulating means, whereby the vertical vibration of the door can be effectively reduced.

With respect to the locking means, further, the lock member 17 and the lock member 18 may be constituted so as to be mutually regulated in the door opening and closing directional movement and also mutually regulated in the vertical movement when mutually engaged. According to this, the vertical vibration of the door can be regulated also by the lock means.

The regulation part 31 of the stopper 30 of this embodiment is substantially parallel to the support plate 15 as shown in FIG. 8A. However, the regulation part 31 is not limited thereby. For example, the regulation part 31 may be inclined down to the door opening direction side as shown in FIG. 8B, or the regulation part 31 may be curved along the door opening directional circumference of the roller 13 as shown in FIG. 8C. In the embodiments of FIGS. 8B and 8C, the regulation part 31 abuts on the roller 13 from above to regulate the movement thereof when the door 3 is in the open end position, and also can regulate the advance over the open end position of the roller 13.

The arrows in FIGS. 8A–8C show the movement of the roller in the opening and closing direction of the door 3.

In the above embodiment, the stopper 30 is provided in the door open end position of the end positions of opening and closing movement of the door 3, but the stopper 30 may be provided on the close end position of the door 3 without being limited thereby.

As described above, the lock means for retaining the door in the end position and the upward movement regulating means for regulating upward movement of the roller are suitably provided on at least the door open end position of the end positions of opening and closing movement of the door.

In this case, the door is retained in the end position by the lock means when the door is in the open end position.

Further, the upward movement of the roller placed on the support part is regulated by the upward movement regulating means, whereby the vertical vibration of the door during traveling and working can be reduced to moderate the impact to the link support structure. Consequently, the durability of the link support structure is improved. The lock means and the upward movement regulating means may be provided also in the close end position of the door.

Figure 3B:
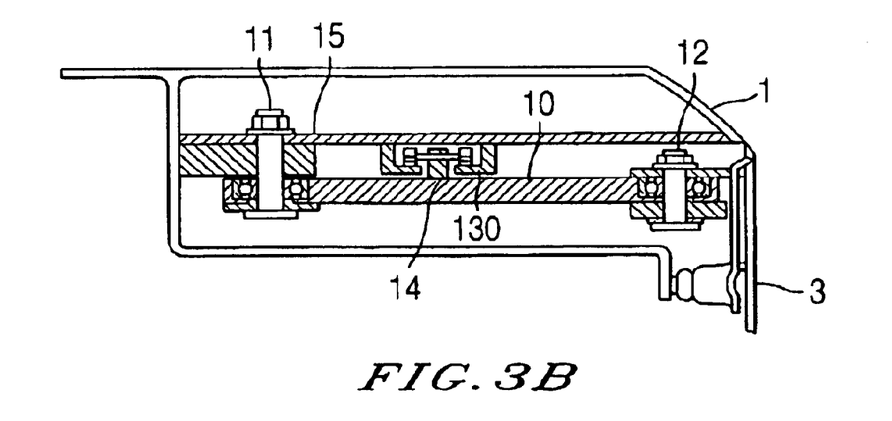
FIG. 3B is a schematic view showing a section taken along the line III—III of FIG. 2, according to yet another embodiment of the invention in which the movable supporter is supported by a guide member.

The weight of the door may be supported by a suspension type support body suspended from the support plate 15 without providing the circular hole 16 of FIG. 2. In this case, as is shown in FIG. 3B. the suspension type support body is constituted so as to be movable within the rail 130 as a guide member provided on the lower surface of the support plate 15. The rail 130 has the same effect as the roller 13 (supported by the bracket 14) placed on the support plate 15 in the point of supporting the support body from above. This guide member is preferably circularly formed to smoothen the movement of the movable supporter.

One embodiment of the present invention is described above, but the scope of protection of the present invention is never limited thereby.

We claim:

1. A cabin with a door, comprising:

a cabin part;

the door adapted to open and close an opening at the side of the cabin part;

links provided between an upper part of the door and an upper part of the cabin part, one end of each link being pivotally supported on a pivotal support of the upper part of the door, and the other end on the upper part of the cabin part;

a movable supporter provided on at least one of the links separate from the pivotal support of the at least one of the links by the cabin part, the movable supporter suspending and supporting the door; and a support member provided on the cabin part and adapted to movably support the movable supporter in opening and closing movement of the door, the movable supporter being placed on the support member.

2. The cabin according to claim 1 wherein the movable supporter is a rolling means.

3. The cabin according to claim 1 wherein the movable supporter is a sliding means.

4. The cabin according to claim 1 wherein the links comprise a first link for mainly supporting a weight of the door and a second link for giving supporting assistance to the first link.

5. The cabin according to claim 1 further comprising:

a lock means adapted to retain the door at a door open end position out of end positions in opening and closing movement of the door; and an upward movement regulating means adapted to regulate an upward movement of the movable supporter.

6. A cabin with a door, comprising:

a cabin part;

the door adapted to open and close an opening at the side of the cabin part;

links provided between an upper part of the door and an upper part of the cabin part, one end of each link being pivotally supported on the upper part of the door, and the other end on the upper part of the cabin part;

a movable supporter provided on at least one of the links, the movable supporter suspending and supporting the door; and a support member provided on the cabin part and adapted to movably support the movable supporter in opening and closing movement of the door, the movable supporter being placed on the support member, wherein the movable supporter is provided on the intermediate part of the at least one of said links.

7. The cabin according to claim 4 wherein a door-side pivotal support member of the first link is arranged on a vertical directional line passing through the center of gravity of the door.

8. A cabin with a door, comprising:

a cabin part;

the door adapted to open and close an opening at the side of the cabin part;

links provided between an upper part of the door and an upper part of the cabin part, one end of each link being pivotally supported on the upper part of the door, and the other end on the upper part of the cabin part, wherein the links comprise a first link for mainly supporting a weight of the door and a second link for giving supporting assistance to the first link;

a movable supporter provided on at least one of the links, the movable supporter suspending and supporting the door;

a support member provided on the cabin part and adapted to movably support the movable supporter in opening and closing movement of the door, the movable supporter being placed on the support member; and a vertical movement regulating means provided on a cabin-side pivotal support member of the second link adapted to regulate a vertical shock of the second link.

9. The cabin according to claim 8 wherein the vertical movement regulating means comprises a pivot fixed to the cabin part and a connecting cylinder provided on one end part of the second link and pivotally fixed to the pivot, said connecting cylinder having such a length so as to regulate the vertical shock of the second link along an axial direction of the pivot.

10. The cabin according to claim 9 wherein the vertical movement regulating means comprises a bearing for rotatably connecting the second link between the pivot and the connecting cylinder, said bearing keeping the second link from moving vertically.

11. A cabin with a door, comprising:

a cabin part;

the door adapted to open and close an opening at the side of the cabin part;

links provided between an upper part of the door and an upper part of the cabin part, one end of each link being pivotally supported on a pivotal support of the upper part of the door, and the other end on the upper part of the cabin part;

a movable supporter provided on at least one of the links separate from the pivotal support of the at least one of the links by the cabin part, the movable supporter suspending and supporting the door; and a support member provided on the cabin part and adapted to movably support the movable supporter in opening and closing movement of the door, the movable supporter being suspended and supported by a guide member provided on a lower surface of the support member.

* * * * *